(12) United States Patent
Mochizuki

(10) Patent No.: US 8,813,922 B2
(45) Date of Patent: Aug. 26, 2014

(54) FRONT FORK

(75) Inventor: Takahisa Mochizuki, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 53 days.

(21) Appl. No.: 13/824,944

(22) PCT Filed: Feb. 29, 2012

(86) PCT No.: PCT/JP2012/055081
§ 371 (c)(1),
(2), (4) Date: Mar. 18, 2013

(87) PCT Pub. No.: WO2012/132730
PCT Pub. Date: Oct. 4, 2012

(65) Prior Publication Data
US 2013/0195689 A1 Aug. 1, 2013

(30) Foreign Application Priority Data
Mar. 31, 2011 (JP) .................................. 2011-79341

(51) Int. Cl.
*F16F 9/34* (2006.01)
*B62K 25/08* (2006.01)
*F04B 7/02* (2006.01)
*F16F 9/50* (2006.01)

(52) U.S. Cl.
CPC ... *F04B 7/02* (2013.01); *F16F 9/50* (2013.01); *F16F 9/34* (2013.01)
USPC .......................................... 188/313; 280/276

(58) Field of Classification Search
USPC .................................... 188/313; 280/275, 276
See application file for complete search history.

(56) References Cited

U.S. PATENT DOCUMENTS

| 2008/0257668 | A1 | 10/2008 | Yamaguchi et al. | |
| 2009/0001684 | A1* | 1/2009 | McAndrews et al. | 280/276 |
| 2009/0261555 | A1* | 10/2009 | Tomiuga et al. | 280/279 |
| 2009/0272611 | A1 | 11/2009 | Hayama et al. | |
| 2011/0247448 | A1* | 10/2011 | Weiss et al. | 74/551.8 |
| 2013/0134688 | A1* | 5/2013 | Mochizuki et al. | 280/276 |

FOREIGN PATENT DOCUMENTS

| EP | 1876090 A1 | 1/2008 |
| JP | 1990-110733 U | 9/1990 |
| JP | 2002-139167 A | 5/2002 |
| JP | 2007-321864 A | 12/2007 |
| JP | 2008-014431 A | 1/2008 |
| JP | 2008-267487 A | 11/2008 |
| JP | 2008-267489 A | 11/2008 |

* cited by examiner

*Primary Examiner* — Christopher Schwartz
(74) *Attorney, Agent, or Firm* — Rabin & Berdo, P.C.

(57) ABSTRACT

A front fork includes a body side tube, an axle side tube, a damper, a reservoir, a damping force adjusting flow passage, and a solenoid valve including a spool housing portion provided at an intermediate position of the damping force adjusting flow passage, a spool valve inserted into the spool housing portion movably in an axial direction, and a solenoid that drives the spool valve in an axial direction, and configured to adjust a flow passage area of the damping force adjusting flow passage. Pressure receiving areas on opposite axial sides of the spool valve on which a pressure in an upstream side of the damping force adjusting flow passage acts are made equal. An upper arrangement passage which is arranged at least higher than the upper end of the spool housing portion is provided in a downstream side of the damping force adjusting flow passage.

6 Claims, 3 Drawing Sheets

FRONT FORK

TECHNICAL FIELD

The present invention relates to a front fork.

BACKGROUND ART

A front fork for suspending a front wheel of a saddle-ridden vehicle is, for example, known. Further, some of dampers built in front forks can adjust a damping force.

JP2008-14431A discloses a damper main body including a cylinder which is connected to an outer tube, a piston which is slidably inserted into the cylinder to partition the interior of the cylinder into a compression side chamber and an extension side chamber, and a piston rod which is inserted into the cylinder and one end of which is connected to the inner tube slidably inserted into the outer tube and the other end of which is connected to the piston.

This damper main body includes a passage for allowing communication between the compression side chamber and the extension side chamber of the damper main body, a check valve provided at an intermediate position of the passage for permitting only a flow from the compression side chamber toward the extension side chamber or conversely permitting only a flow from the extension side chamber toward the compression side chamber, a needle valve provided at an intermediate position of the passage, and a stepping motor fixed to the other end of the piston rod for driving the needle valve.

This front fork exerts a damping force by giving resistance to the flow of hydraulic oil by a piston valve provided in the piston at the time of extension and exerts a damping force by giving resistance to the flow of hydraulic oil exiting from the cylinder to a reservoir by a base valve provided at an end part of the cylinder at the time of contraction. Further, by driving the needle valve to adjust flow passage resistance at the needle valve, the damping force generated by the front fork can be changed.

SUMMARY OF THE INVENTION

Since the stepping motor is used to drive the needle valve in the above front fork, it takes time to change a valve opening. Thus, in the case of adjusting the damping force of the front fork by an active control such as a sky-hook control, a response of the damping force adjustment cannot keep up with the control, wherefore it is difficult to execute the above control.

It is also conceivable to use a solenoid to improve the responsiveness of the damping force adjustment. However, since a damper for saddle-ridden vehicle such as a front fork has a very long stroke and a large flow rate as compared with a damper for four-wheeled vehicle, a pressure acting on a needle valve becomes very high. This makes it necessary to make a thrust force of a solenoid for driving the needle valve extremely large, which leads to a possibility that the solenoid is enlarged to impair mountability into a saddle-ridden vehicle and cost increases to impair economic efficiency.

The present invention aims to provide a front fork capable of actively controlling a damping force adjustment using a low-cost and small-size solenoid.

According to one aspect of the present invention, a front fork is provided which comprises a body side tube which is connected to a body of a saddle-ridden vehicle; an axle side tube which is connected to an axle of the saddle-ridden vehicle and is slidably fitted to the body side tube to form a space inside together with the body side tube; a damper which includes an extension side chamber compressed at the time of extension and a compression side chamber compressed at the time of contraction inside, is interposed between the body side tube and the axle side tube and is housed in the space; a reservoir which is provided inside the space and outside the damper; a damping force adjusting flow passage which allows communication between the compression side chamber or the extension side chamber as an upstream side and the reservoir as a downstream side; and a solenoid valve which includes a spool housing portion provided at an intermediate position of the damping force adjusting flow passage, a spool valve inserted into the spool housing portion movably in an axial direction and a solenoid driving the spool valve in the axial direction, and is configured to adjust a flow passage area of the damping force adjusting flow passage; wherein: pressure receiving areas on opposite axial sides of the spool valve on which a pressure in an upstream side of the damping force adjusting flow passage acts are made equal; and an upper arrangement passage which is arranged at least higher than an upper end of the spool housing portion is provided in a downstream side of the damping force adjusting flow passage.

Embodiments of the present invention and advantages thereof are described in detail below with reference to the accompanying drawings.

EMBODIMENTS OF THE INVENTION

Hereinafter, the present invention is described based on an illustrated embodiment.

Figure 1:
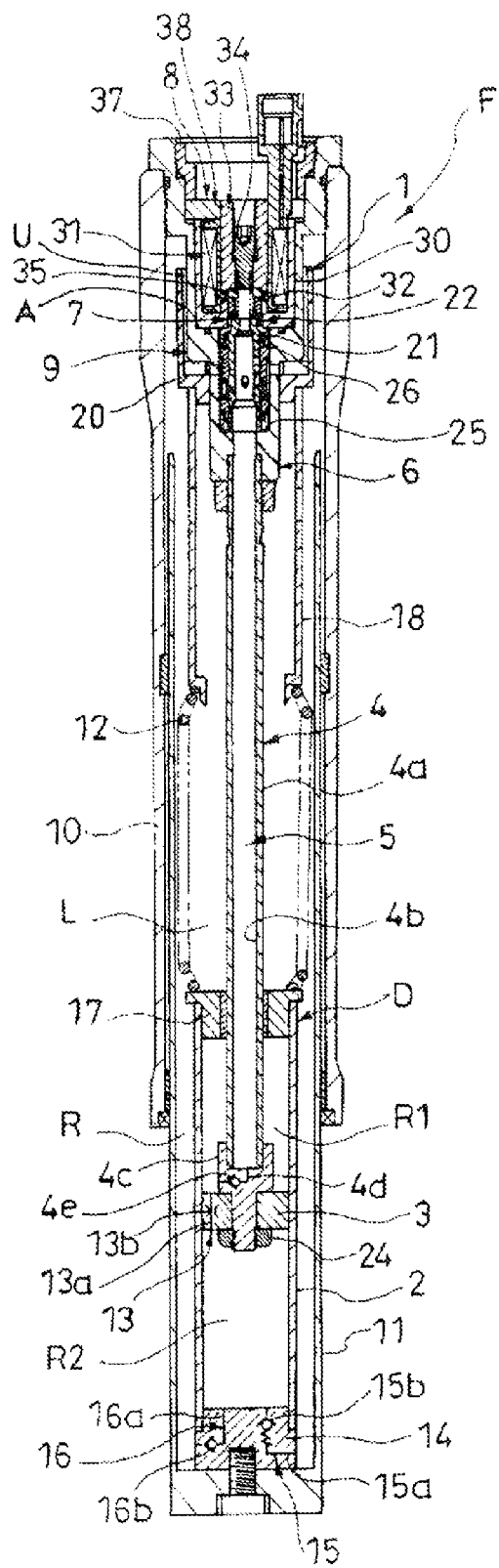
FIG. 1 is a sectional view of a front fork according to one embodiment of the present invention.
Figure 2:
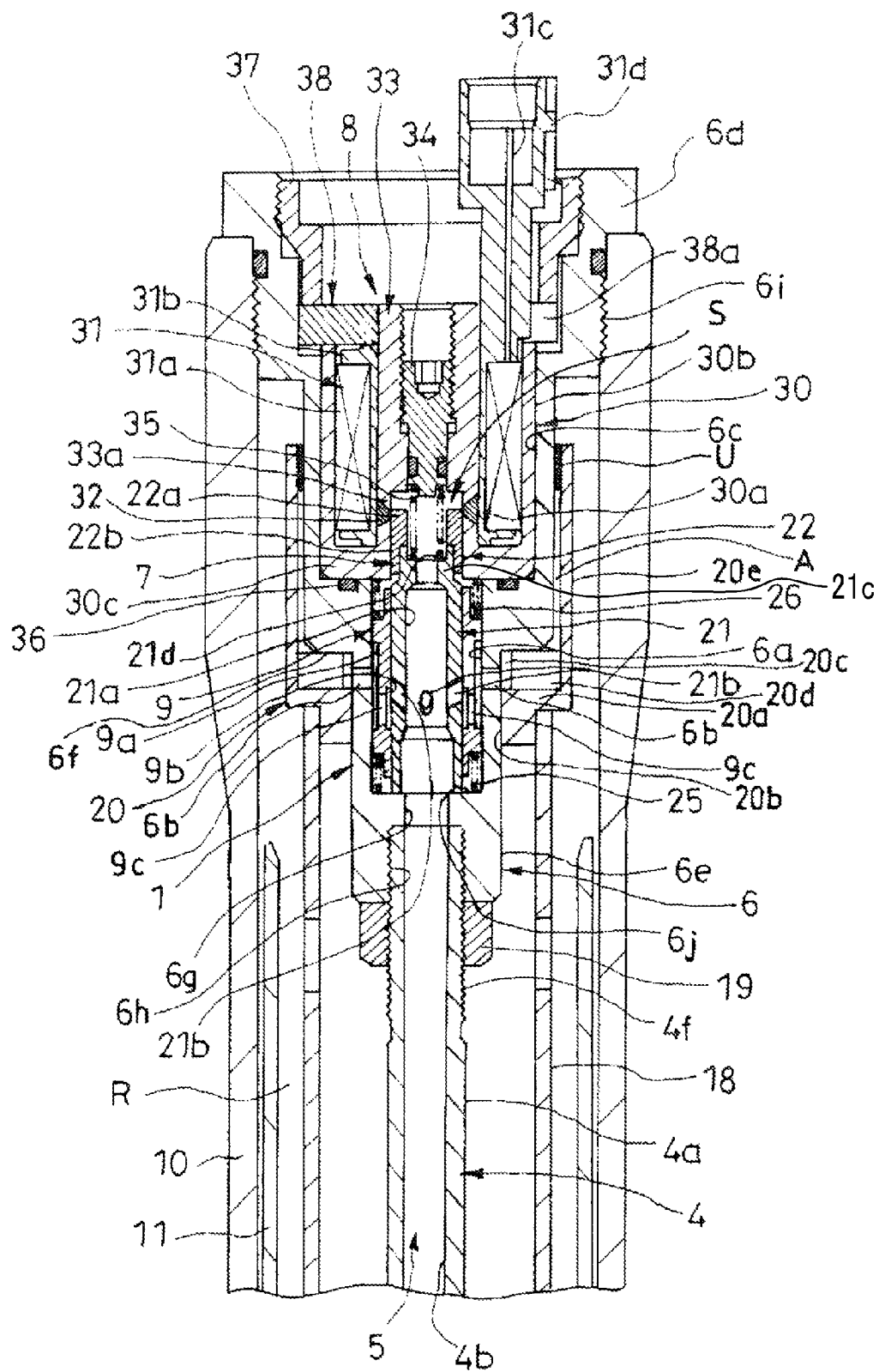
FIG. 2 is a partial enlarged sectional view of the front fork according to the one embodiment of the present invention.

As shown in FIGS. 1 and 2, a front fork F in this embodiment includes a body side tube 10 to be connected to a body of a saddle-ridden vehicle, an axle side tube 11 to be connected to an axle of the saddle-ridden vehicle and slidably fitted into the body side tube 10 to form a space L inside together with the body side tube 10, a damper D internally including an extension side chamber R1 to be compressed at the time of extension and a compression side chamber R2 to be compressed at the time of contraction and interposed between the body side tube 10 and the axle side tube 11 to be housed in the space L, a reservoir R provided inside the space L and outside the damper D, a damping force adjusting flow passage 5 for allowing communication between the extension side chamber R1 as an upstream side and the reservoir R as a downstream side, and a solenoid valve 1 provided at an intermediate position of the damping force adjusting flow passage 5.

The damper D includes a cylinder 2, a piston 3 slidably inserted into the cylinder 2 to partition the interior of the cylinder 2 into the extension side chamber R1 and the compression side chamber R2 which are filled with fluid such as hydraulic oil, and a piston rod 4 inserted into the cylinder 2 and connected to the piston 3. The damper D exerts a damping force to interfere with extension and contraction at the time of extension and contraction. The solenoid valve 1 is provided at the intermediate position of the damping force adjusting flow passage 5 for allowing communication between the extension side chamber R1 of the damper D and the reservoir R and permitting the passage of the fluid only when the damper D extends, and can adjust a damping force generated by the damper D.

For easer mounting into the saddle-ridden vehicle, the damper D is housed in the space L formed by the body side tube 10 of which the piston rod 4 is connected to the body of the saddle-ridden vehicle such as a two-wheeled vehicle and the axle side tube 11 to be connected to the axle of the saddle-ridden vehicle and slidably inserted into the body side tube. The piston rod 4 is connected to the body side tube 10 via a housing 6 and the cylinder 2 is directly connected to the axle side tube 11, whereby the damper D is interposed between the body side tube 10 and the axle side tube 11 and housed in the space L closed by the body side tube 10 and the axle side tube 11. Although the front fork F is described as an inverted front fork in which the axle side tube 11 is slidably fitted into the body side tube 10 in this embodiment, it may be, conversely, an upright front fork in which the body side tube 10 is slidably fitted into the axle side tube 11.

A suspension spring 12 is interposed between the piston rod 4 and the cylinder 2 of the damper D. The suspension spring 12 exerts an elastic force in a direction to separate the body side tube 10 and the axle side tube 11 via the damper D, i.e. in a direction to extend the front fork F. The body of the saddle-ridden vehicle is elastically supported by the suspension spring 12.

As shown in FIG. 1, the damper D includes the cylinder 2 connected to the axle side tube 11, the piston 3 slidably inserted into the cylinder 2 to partition the interior of the cylinder 2 into the extension side chamber R1 and the compression side chamber R2 that are two working chambers, the piston rod 4 one end of which is connected to the piston 3 and the other end of which is connected to the body side tube 10, a damping passage 13 provided in the piston 3 for allowing communication between the extension side chamber R1 and the compression side chamber R2 and giving resistance to the flow of the passing fluid, and a bottom member 14 including a compression side damping passage 15 provided at the lower end of the cylinder 2 for giving resistance to the flow of the fluid from the compression side chamber R2 toward the reservoir R and a suction passage 16 for permitting only the flow of the fluid from the reservoir R toward the compression side chamber R2. The extension side chamber R1 and the compression side chamber R2 are filled with the fluid such as hydraulic oil and the reservoir R is filled with the fluid and gas.

The cylinder 2 is fixed to a bottom part of the axle side tube 11 formed into a bottomed tube via the bottom member 14 fitted at the lower end. A rod guide 17 slidably and rotatably supporting the piston rod 4 is provided at the upper end of the cylinder 2. The piston rod 4 includes a piston rod main body 4a with a hole 4b vertically penetrating along an axial direction in FIG. 1 and a piston connecting portion 4c fixed to the lower end of the piston rod main body 4a in FIG. 1 for holding the piston 3. The leading end of the piston rod 4 at an upper side in FIG. 1 is fixed to the upper end of the body side tube 10 via the housing 6 housing a spool valve 7 of the solenoid valve 1 to be described later. The piston connecting portion 4c includes a communication passage 4d for allowing communication between the hole 4b and the extension side chamber R1 and a check valve 4e provided at an intermediate position of the communication passage 4d for permitting only the flow of the fluid from the extension side chamber R1 toward the hole 4b. The annular piston 3 is fixed to the lower end of the piston connecting portion 4c in FIG. 1 using a piston nut 24.

The suspension spring 12 is interposed between the rod guide 17 and a tubular spring bearing 18 provided on the outer periphery of the housing 6, and the damper D is biased in an extension direction by the suspension spring 12. By this, the front fork F is also biased in the extension direction by the suspension spring 12.

The piston 3 is fixed to the lower end of the piston rod 4 in FIG. 1, i.e. the lower end of the piston connecting portion 4c. The damping passage 13 provided in the piston 3 includes a passage 13a for allowing communication between the extension side chamber R1 and the compression side chamber R2 and a damping valve 13b provided at an intermediate position of the passage 13a and gives resistance to the flow of the passing fluid. In this embodiment, the damping valve 13b is a throttle valve or the like and the damping passage 13 permits both the flow of the fluid from the extension side chamber R1 toward the compression side chamber R2 and the flow of the fluid from the compression side chamber R2 toward the extension side chamber R1. However, instead of this, two or more passages may be provided, so that a damping valve for permitting only the flow of the fluid from the extension side chamber R1 toward the compression side chamber R2 may be provided in one or more passages and a damping valve for permitting only the flow of the fluid from the compression side chamber R2 toward the extension side chamber R1 may be provided in the other passage(s).

The reservoir R is formed inside the space L and outside the damper D. The reservoir R is filled with the fluid and gas. The compression side damping passage 15 formed in the bottom member 14 is a one-way passage which includes a passage 15a for allowing communication between the compression side chamber R2 and the reservoir R and a damping valve 15b for permitting only the flow of the fluid from the compression side chamber R2 toward the reservoir R and giving resistance to the flow of the passing fluid, and permits only the flow of the fluid from the compression side chamber R2 toward the reservoir R. On the other hand, the suction passage 16 formed in the bottom member 14 is a one-way passage which includes a passage 16a for allowing communication between the reservoir R and the compression side chamber R2 and a check valve 16b for permitting only the flow of the fluid from the reservoir R toward the compression side chamber R2, and permits only the flow of the fluid from the reservoir R toward the compression side chamber R2 in a direction opposite to that in the compression side damping passage 15. This damper D can generate a compression side damping force at the damping valve 15b. Thus, in the case of providing a passage for permitting only the flow of the fluid from the compression side chamber R2 toward the extension side chamber R1 as described above, a damping valve may not be provided in this passage.

The solenoid valve 1 is now described. The solenoid valve 1 is provided at an intermediate position of the damping force adjusting flow passage 5, includes a spool housing portion S provided at an intermediate position of the damping force adjusting flow passage 5, the spool valve 7 inserted into the spool housing portion S movably in the axial direction and a solenoid 8 for driving the spool valve 7 in the axial direction, and can adjust a flow passage area of the damping force adjusting flow passage 5.

The solenoid valve 1 includes the housing 6 with a hollow portion 6a which is a part of the spool housing portion S and a port 6b which is open to the outside and communicates with the hollow portion 6a, the spool valve 7 inserted into the hollow portion 6a movably in the axial direction, a spool spring 35 for biasing the spool valve 7, the solenoid 8 for driving the spool valve 7 in the axial direction against a biasing force of the spool spring 35, a movable sleeve 9 inserted between the spool valve 7 and the housing 6 slidably in the axial direction and a pair of sleeve springs 25, 26 for sandwiching and elastically supporting opposite axial ends of the movable sleeve 9.

The housing 6 is tubular as shown in FIGS. 1 and 2 and includes the hollow portion 6a that is open at a lower end in FIG. 2 and formed inside, the port 6b that is open laterally and communicates with the hollow portion 6a, a solenoid housing portion 6c which is open on an upper end in FIG. 2 to communicate with the hollow portion 6a, has a larger diameter than the hollow portion 6a and houses the solenoid 8, a flange 6d provided on the outer periphery of the upper end, a small diameter portion 6e provided by reducing the diameter of the outer periphery of the lower end side, and a step portion 6f.

The housing 6 further includes a small inner diameter portion 6g provided by reducing the diameter of a lower part of the hollow portion 6a in FIG. 2 and a threaded portion 6h provided on the inner periphery of a lower part of the small inner diameter portion 6g. A threaded portion 4f is provided on the outer periphery of the upper end of the piston rod 4. The upper end of the piston rod 4 is inserted into the small inner diameter portion 6g and the housing 6 and the piston rod 4 are threadably fastened by engaging the threaded portion 4f with the threaded portion 6h. A nut 19 is threadably mounted on the threaded portion 4f, and the loosening of the threaded portions 6h, 4f is prevented by bringing the upper end of the nut 19 in FIG. 2 into contact with the lower end of the housing 6 in FIG. 2 to apply an axial load to the housing 6.

Figure 3:
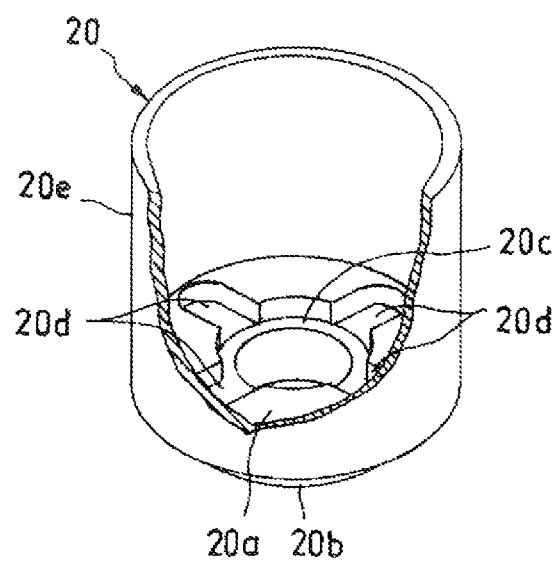
FIG. 3 is a perspective view, partly cut away, of a passage forming member.

A tubular passage forming member 20 is mounted on the outer periphery of the housing 6. The passage forming member 20 is in the form of a bottomed tube with a bottom portion 20a as shown in FIGS. 2 and 3. The bottom portion 20a includes a fitting hole 20b which enables the insertion of the small diameter portion 6e of the housing 6, an annular recess 20c communicating with the fitting hole 20b at the upper end of the bottom portion 20a in FIG. 2 and a plurality of grooves 20d radially extending from the outer periphery of the annular recess 20c at the upper end of the bottom portion 20a in FIG. 2. An inner diameter of a tubular portion 20e of the passage forming member 20 is so set that an annular clearance A is formed between the tubular portion 20e and the outer periphery of the housing 6. When the small diameter portion 6e of the housing 6 is inserted and fitted into the fitting hole 20b provided in the bottom portion 20a of this passage forming member 20 until the step portion 6f comes into contact with the bottom portion 20a, the annular recess 20c of the passage forming member 20 faces the port 6b provided in the housing 6. The annular recess 20c communicates with the annular clearance A via the grooves 20d, whereby the port 6b communicates with the reservoir R provided in the space L via the annular recess 20c, the grooves 20d and the annular clearance A.

Further, the passage forming member 20 supports the upper end of the tubular spring bearing 18 for bearing the upper end of the suspension spring 12, and the spring bearing 18 is prevented from moving away from the housing 6 by the biasing force of the suspension spring 12. It should be noted that the passage forming member 20 may be united with the housing 6 by being press-fitted or threadably mounted into the small diameter portion 6e of the housing 6.

A threaded portion 6i is provided on the outer periphery of an upper part of the housing 6 in FIG. 2, and the housing 6 can be threadably fastened to an opening end of the body side tube 10. This causes the piston rod 4 to be connected to the body side tube 10 via the housing 6.

When the housing 6 is connected to the piston rod 4, the hollow portion 6a and the hole 4b of the piston rod 4 are coaxially connected in series, and the hollow portion 6a communicates with the extension side chamber R1 in the damper D via the hole 4b and the communication passage 4d. The hollow portion 6a communicates with the reservoir R via the port 6b, the annular recess 20c, the grooves 20d and the annular clearance A. Thus, the damping force adjusting flow passage 5 is formed by the communication passage 4d, the hole 4b, the hollow portion 6a, the port 6b, the annular recess 20c, the grooves 20d and the annular clearance A and allows communication between the extension side chamber R1 and the reservoir R.

The damping force adjusting flow passage 5 permits only the flow of the fluid from the extension side chamber R1 toward the reservoir R by the check valve 4e. Accordingly, a part of the damping force adjusting flow passage 5 upstream of the solenoid valve 1 is formed by the hole 4b and the communication passage 4d and a downstream passage of the damping force adjusting flow passage 5 downstream of the solenoid valve 1 is formed by the port 6b, the annular recess 20c, the grooves 20d and the annular clearance A. It should be noted that although the downstream passage is formed by the passage forming member 20 and allows the port 6b to communicate with the reservoir R, there is no limitation to the above configuration. For example, a passage forming member in the form of a pipe may allow the port 6b to communicate with the reservoir R.

The check valve that sets the damping force adjusting flow passage 5 to be one-way may not be provided in the piston connecting portion 4c and may be provided at another position. For example, a check valve may be provided in the hole 4b of the piston rod main body 4a or may be provided at the opening end of the hole 4b at the upper end of the piston rod main body 4a in FIG. 1.

The movable sleeve 9 is tubular and inserted into the hollow portion 6a of the housing 6 slidably in the axial direction. The movable sleeve 9 includes a sleeve side annular groove 9a formed along a circumferential direction on the outer periphery, an inner peripheral side annular groove 9b formed along the circumferential direction on the inner periphery, and a sleeve port 9c for allowing communication between the sleeve side annular groove 9a and the inner peripheral side annular groove 9b.

The movable sleeve 9 is sandwiched by the pair of sleeve springs 25, 26 at the opposite axial ends thereof, i.e. the upper and lower ends, and positioned at a position where biasing forces of the sleeve springs 25, 26 are balanced in a state where no load is acting. It should be noted that the sleeve spring 25 is interposed between an inner peripheral step portion 6j provided by forming the small inner diameter portion 6g below the hollow portion 6a of the housing 6 and the lower end of the movable sleeve 9 in FIG. 2. The sleeve spring 26 is interposed between a case 30 of the solenoid 8 to be described later and the upper end of the movable sleeve 9 in FIG. 2. The sleeve springs 25, 26 both bias the movable sleeve 9 from upper and lower sides in a compressed state.

Since being elastically supported by the sleeve springs 25 and 26, the movable sleeve 9 vibrates in a vertical direction in FIG. 2, which is the axial direction, when the damper D vibrates due to the application of an external force. In a stroke range of the movable sleeve 9, an axial length of the sleeve side annular groove 9a is so set that the sleeve side annular groove 9a constantly faces the port 6b, whereby the port 6b is not blocked by the movable sleeve 9. Even if the movable sleeve 9 blocks a part of the port 6b, a flow passage area of the port 6b is set to be equal to or larger than a maximum value of the flow passage area determined by the movable sleeve 9 and the spool valve 7. That is, the port 6b does not give resistance larger than that given by a throttle formed by the movable sleeve 9 and the spool valve 7.

The sleeve side annular groove 9a communicating with the sleeve port 9c along the circumferential direction is provided on the outer periphery of the movable sleeve 9 and communication between the sleeve port 9c and the port 6b is ensured even if the movable sleeve 9 moves in the axial direction relative to the housing 6. By this, the communication between the sleeve port 9c and the port 6b can be ensured by applying easily performed outer periphery processing to the movable sleeve 9. It should be noted that a housing side annular groove extending along the circumferential direction and communicating with the port 6b may be provided on the inner periphery of the hollow portion 6a of the housing 6 instead of providing the sleeve side annular groove 9a, and the communication between the sleeve port 9c and the port 6b may be ensured by causing this housing side annular groove to constantly face the sleeve port 9c.

The upper and lower ends of the movable sleeve 9 are each formed to have a smaller outer diameter, and the sleeve springs 25, 26 are arranged on the outer peripheries of the small diameter parts. This makes a fitting length of the movable sleeve 9 and the spool valve 7 longer to guarantee stable relative sliding movements of the movable sleeve 9 and the spool valve 7.

The spool valve 7 is cylindrical, slidably inserted into the movable sleeve 9 with one end side faced downward, and movable in the vertical direction in FIG. 2, which is the axial direction, in the hollow portion 6a of the housing 6. The spool valve 7 includes a spool valve main body 21 and a tubular magnetic member 22 which is fitted to the other end side of the spool valve main body 21 to be united. The spool valve main body 21 is made of a material having a smaller specific weight than the magnetic member 22 such as synthetic resin, aluminum, aluminum alloy and magnesium alloy. In the case of using synthetic resin, it is preferable to use a material which is good in sliding and resistant to abrasion. For example, polyacetal, polybutylene terephthalate, polyphenylene sulfide, polyimide, polyamideimide and polyether ketone can be used. If the working fluid is oil, phenolic resin can be used in addition to the above.

The spool valve main body 21 receives a pressure of the fluid passing in the damping force adjusting flow passage 5 at a lower end in FIG. 2 that is an opposite solenoid side end opposite to a side facing the solenoid 8. The spool valve main body 21 includes a pressure introducing hole 21a which is open at the opposite solenoid side end and communicates with an upper end in FIG. 2 that is a solenoid side end, a spool port 21b which is open at the outer periphery and communicates with the pressure introducing hole 21a, and a fitting portion 21c which is formed by reducing a diameter of the outer periphery of the solenoid side end.

The magnetic member 22 is in the form of a tube made of a magnetic material such as iron, nickel, cobalt, alloys containing these, and ferrite and includes a base portion 22a at an upper side in FIG. 2, and a socket 22b in the form of a tube thinner than the base portion 22a and extending from the base portion 22a toward the spool valve main body 21 which is a lower side in FIG. 2. The magnetic member 22 has a single outer diameter and is united with the spool valve main body 21 by fitting the fitting portion 21c of the spool valve main body 21 into the socket 22b. For example, by press-fitting the fitting portion 21c of the spool valve main body 21 into the socket 22b, the spool valve main body 21 and the magnetic member 22 are firmly united. If the spool valve main body 21 is made of a metal material, the spool valve main body 21 and the magnetic member 22 may be shrink-fitted. Further, they may be united by applying an adhesive to the fitting portion.

The spool port 21b in the spool valve 7 can face the inner peripheral side annular groove 9b of the movable sleeve 9. In a facing state, the spool port 21b communicates with the sleeve port 9c and communicates with the port 6b via the sleeve port 9c, whereby the damping force adjusting flow passage 5 is opened. If the spool valve 7 is moved toward the solenoid 8, an overlap area of the spool port 21b and the inner peripheral side annular groove 9b (facing area of the spool port 21b and the inner peripheral side annular groove 9b) becomes smaller, whereby the flow passage area in the solenoid valve 1 can be reduced (flow passage can be narrowed). As just described, in the solenoid valve 1, the spool port 21b of the spool valve 7 and the sleeve port 9c of the movable sleeve 9 form a part of the flow passage, and the flow passage area can be changed according to relative positions of the spool valve 7 and the movable sleeve 9 in the axial direction. It should be noted that the spool port 21b of the spool valve 7 may be set to be completely closed on the inner periphery of the movable sleeve 9 to block the flow passage as a result of narrowing the flow passage.

By providing the inner peripheral side annular groove 9b on the inner periphery of the movable sleeve 9, the spool port 21b and the sleeve port 9c can communicate regardless of the rotational positions even if the spool valve 7 rotates in the circumferential direction relative to the movable sleeve 9. Instead of the inner peripheral side annular groove 9b, an annular groove communicating with the spool port 21b may be provided on the outer periphery of the spool valve 7 to enable the sleeve port 9c of the movable sleeve 9 and the spool port 21b to communicate.

A fluid force for relatively displacing the spool valve 7 and the movable sleeve 9 is generated when the fluid passing the spool port 21b flows. However, since the spool port 21b is provided obliquely to an axis line of the spool valve 7, the above fluid force can be reduced.

The solenoid 8 includes the case 30 that is composed of an inner tube 30a, an outer tube 30b and an annular bottom portion 30c connecting lower ends of the inner tube 30a and the outer tube 30b in FIG. 2 and made of a magnetic material, a tubular mold coil 31 which is formed by molding a coil 31a housed between the outer tube 30b and the inner tube 30a by mold resin 31b, a base 33 which is tubular, made of a magnetic material and inserted into an inner peripheral side of the mold coil 31, a nonmagnetic ring 32 which provides an annular gap between the base 33 and the inner tube 30a of the case 30, an adjuster 34 which is threadably mounted into the base 33 and the spool spring 35 which is interposed between the adjuster 34 and the spool valve 7. The solenoid 8 can drive the spool valve 7 by energizing the coil 31a using the magnetic member 22 in the spool valve 7 as a movable iron core.

An inner diameter of the inner tube 30a of the case 30 is set to enable the spool valve 7 to be movably insertable into the inner tube 30a and to be smaller than an inner diameter of the hollow portion 6a. When being housed in the housing portion 6c of the housing 6, the inner tube 30a can support the upper end of the sleeve spring 26 in FIG. 2 without hindering a movement of the spool valve 7. It should be noted that the inner diameter of the inner tube 30a may be so set that the spool valve 7 is slidable.

The case 30 is radially positioned relative to the housing 6 by fitting the outer tube 30b and the housing portion 6c of the housing 6. Further, in the case of sliding the spool valve 7 in contact with the hollow portion 6a of the housing 6 and the inner periphery of the inner tube 30a of the case 30, the positioning can also be performed by utilizing the spool valve 7. Tight sealing is provided between the case 30 and the housing 6 by an annular seal 36 interposed between the annular bottom portion 30c of the case 30 and the housing 6.

The mold coil 31 includes a tubular connector 31d for housing a power supply terminal 31c for energizing the coil 31a inside. The connector 31d is united with the coil 31a by the mold resin 31b. The coil 31a can be energized from the outside by connecting the power supply terminal 31c in the connector 31d to an external power supply.

The base 33 is tubular and inserted into the inner peripheral side of the mold coil 31. The base 33 includes an annular projection 33a projecting toward the spool valve on the outer periphery of a spool valve side end which is a lower end in FIG. 2. The outer periphery of the annular projection 33a is chamfered to be tapered. The nonmagnetic ring 32 made of aluminum, copper, zinc, nonmagnetic stainless steel such as SUS305, high-manganese steel or the like is interposed between the annular projection 33a and the inner tube 30a of the case 30. The nonmagnetic ring 32 is united with the case 30 and the base 33 by brazing or the like. When the magnetic member 22 is attracted by the base 33 magnetized at the time of energizing the coil 31a, the nonmagnetic ring 32 forms a gap between the base 33 and the case 30 so that a magnetic path goes through the magnetic member 22. The nonmagnetic ring 32 further unites the case 30 and the base 33 and seals between the case 30 and the base 33.

An annular end ring 38 with a slit 38a for permitting the passage of the connector 31d is laminated on the upper ends of the mold coil 31 and the case 30 in FIG. 2 on the outer periphery of the base 33. A nut member 37 is threadably mounted on the inner periphery of an upper end in FIG. 2 that serves as an opening end of the housing portion 6c of the housing 6 above the end ring 38 in FIG. 2. The mold coil 31 and the case 30, and the nonmagnetic ring 32 and the base 33 united with the mold coil 31 and the case 30 are sandwiched by the nut member 37 and the housing 6 and fixed to the housing 6.

To provide the gap between the base 33 and the inner tube 30a of the case 30, besides interposing the nonmagnetic ring 32, a tubular filler ring may be press-fitted between the outer periphery of the inner tube 30a of the case 30 and the outer periphery of the base 33 to provide a gap and the case 30 and the base 33 may be united. In this case, the nonmagnetic ring 32 can be omitted. In using the filler ring, an axial length of the inner tube 30a of the case 30 becomes longer than in the case of uniting the case 30 and the base 33 by the nonmagnetic ring 32 since a sufficient fitting length to the filler ring has to be secured. In other words, by adopting a structure of uniting the case 30 and the base 33 by the nonmagnetic ring 32, the entire length of a non-movable part of the solenoid 8 can be made shorter.

The adjuster 34 is shaft-like, includes a threaded portion on the outer periphery of a base end which is an upper end in FIG. 2 and is threadably mounted on the inner periphery of a tubular part of the base 33, and the spool spring 35 is interposed in a compressed state between a lower end in FIG. 2, which serves as a leading end, and the spool valve 7.

A step portion 21d is formed at an intermediate position of the pressure introducing hole 21a in the spool valve 7, and the spool spring 35 is interposed between the step portion 21d and the adjuster 34. By moving the adjuster 34 back and forth relative to the base 33 in the vertical direction in FIG. 2 that is the axial direction in the manner of a feed screw to adjust a compressed length of the spool spring 35, an initial load applied to the spool valve 7 by the spool spring 35 can be adjusted. The adjuster 34 functions also as a lid for sealing the hollow portion 6a, and the spool housing portion S for housing the spool valve 7 is formed by the hollow portion 6a, the case 30, the base 33 and the adjuster 34.

Since the spool spring 35 is housed in the magnetic member 22, a housing space for the spool spring 35 is secured and the entire length of the solenoid 8 including the adjuster 34 can be made shorter.

In the solenoid 8, when the coil 31a is energized, the base 33 is magnetized to generate an attraction force for attracting the magnetic member 22 and the spool valve 7 can be driven upward in FIG. 2 against the biasing force of the spool spring 35. In a state where the magnetic member 22 is attracted to the base 33, i.e. in a state where the upper end of the base portion 22a of the magnetic member 22 in FIG. 2 is completely held in contact with the inner periphery of the lower end of the base 33 in FIG. 2, the base portion 22a thicker than the socket 22b is facing the inner tube 30a of the case 30 in a radial direction. Further, since the socket 22b is fitted to the outer periphery of the other end of the spool valve main body 21 and facing the inner tube 30a, the cross-sectional area of the magnetic path becoming excessively small and magnetic flux density becoming saturated to reduce the attraction force is prevented.

The spool valve 7 is housed in the spool housing portion S formed by the hollow portion 6a of the housing 6, the case 30, the base 33 and the adjuster 34 and can move in the axial direction in the spool housing portion S.

The upper end of the annular clearance A formed by the passage forming member 20 and the housing 6 is arranged higher than that of the spool housing portion S in FIG. 2. By this, an upper arrangement passage U (hatched part in the upper end of the annular clearance A in FIG. 2) is arranged higher than the upper end of the spool housing portion S in the annular clearance A as the downstream passage. That is, the upper end of the annular clearance A that becomes a final end forms the upper arrangement passage U. This is to make the upper end of the upper arrangement passage U higher than the upper end of the spool housing portion S also in a mounted state of the front fork F in the saddle-ridden vehicle, considering that the front fork F is mounted in an oblique posture in the saddle-ridden vehicle. Since a fluid level in the upper arrangement passage U is higher than the spool housing portion S by providing the upper arrangement passage U, the entrance of gas from the reservoir R side into the spool housing portion S is inhibited. Vibration is input to the front fork F in front-back and vertical directions during the travel of the saddle-ridden vehicle. By setting the final end of the annular clearance A as the upper arrangement passage U, a disturbance of the fluid level in the upper arrangement passage U can be suppressed while the flow passage area is secured, wherefore the entrance of gas into the spool housing portion S can be reliably prevented.

When being biased by the spool spring 35, the spool valve 7 is positioned at a lowest position in the hollow portion 6a. When the lower end of the spool valve 7 comes into contact with the inner peripheral step portion 6j, any further movement of the spool valve 7 toward the piston rod 4 is limited and the spool valve 7 is positioned at this lowest position.

At this lowest position, the spool port 21b of the spool valve 7 faces the inner peripheral side annular groove 9b and communicates with the port 6b via the sleeve port 9c, and the damping force adjusting flow passage 5 is opened.

When the coil 31a is energized and the spool valve 7 is attracted to the base 33, the spool valve 7 retracts upward in FIG. 2 in the hollow portion 6a and the overlap area of the spool port 21b and the inner peripheral side annular groove 9b becomes smaller to reduce the flow passage area. Further, by controlling a movement amount of the spool valve 7 by the amount of energization to the coil 31a, the overlap area of the spool port 21b and the inner peripheral side annular groove 9b can be adjusted. That is, the spool valve 7 can be driven upward in FIG. 2 by energizing the coil 31a and driven downward in FIG. 2 by stopping energization to the coil 31a, and the position of the spool valve 7 can be adjusted by the amount of energization to the coil 31a. In this way, the spool valve 7 can be driven in the vertical direction in FIG. 2, which is the axial direction, by the solenoid 8.

By narrowing the flow passage by the spool port 21b and the sleeve port 9c, resistance given to the flow of the fluid trying to pass in the flow passage can be made larger as compared with the case where the spool valve 7 is located at the lowest position. Since the overlap area of the spool port 21b and the inner peripheral side annular groove 9b decreases and a degree of narrowing the flow passage increases as a retraction amount of the spool valve 7 increases, resistance given to the flow of the fluid passing in the passage increases as the retraction amount of the spool valve 7 increases.

Here, if it is assumed that Mb, Kb, Ms and Ks respectively denote a mass of the spool valve 7, a spring constant of the spool spring 35, a mass of the movable sleeve 9 and a combined spring constant of the sleeve springs 25, 26, the setting is made to satisfy a relationship of Mb/Kb=Ms/Ks.

As described above, the spool valve 7 is supported by the spool spring 35. Thus, if an acceleration acts on the solenoid valve 1 in the vertical direction in FIG. 2, which is the axial direction of the spool valve 7, due to an external input, an inertial force is generated in the spool valve 7 by the action of this acceleration and the spool valve 7 relatively moves with respect to the housing 6. Similarly, an inertial force is generated in the movable sleeve 9, which relatively moves with respect to the housing 6.

If α denotes the acceleration in this case, the inertial force acting on the spool valve 7 is Mb·α. If the spool valve 7 moves by a displacement Xb relative to the housing 6 due to this inertial force and is balanced with the biasing force of the spool spring 35, Mb·α=Xb·Xb holds. Further, the inertial force of the movable sleeve 9 is Ms·α. If the movable sleeve 9 moves by a displacement Xs relative to the housing 6 and is balanced with the biasing forces of the sleeve springs 25, 26, Ms·α=Ks·Xs holds.

The displacement Xb of the spool valve 7 is Xb=Mb·α/Kb and the displacement Xs of the movable sleeve 9 is Xs=Ms·α/Ks. Xb=Ks is derived from these two equations and the relationship of Mb/Kb=Ms/Ks and the displacement Xb of the spool valve 7 and the displacement Xs of the movable sleeve 9 become equal.

Thus, even if an acceleration acts on the solenoid valve 1 in the vertical direction of FIG. 2, which is the axial direction of the spool valve 7, due to an external input, the spool valve 7 does not relatively move with respect to the movable sleeve 9 and the flow passage area does not change.

If a large acceleration acts on the front fork F in the vertical direction during the travel of the vehicle, a direction of this acceleration substantially coincides with a sliding direction of the spool valve 7. In this embodiment, the spool valve 7 is composed of the magnetic member 22 that functions as the movable iron core and the spool valve main body 21 that has a smaller specific weight than the magnetic member 22. Thus, the weight of the entire spool valve 7 that is a movable part in the solenoid valve 1 is reduced. Therefore, the vibration of the spool valve 7 can be made more minimal by making the inertial force of the spool valve 7 caused by the above acceleration smaller. To further reduce the weight of the spool valve main body 21, the spool valve main body 21 is made as thin as possible by increasing the inner diameter of the pressure introducing hole 21a.

A pressure in a side of the damping force adjusting flow passage 5 upstream of the solenoid valve 1 acts not only on the lower end of the spool valve 7 in FIG. 2 that is the opposite solenoid side end, but also on the solenoid end side of the spool valve 7 due to the pressure introducing hole 21a. That is, the above pressure acts on pressure receiving surfaces on the opposite axial ends of the spool valve 7. Further, a pressure receiving area of the opposite solenoid side end of the spool valve 7 on which the pressure in the side of the damping force adjusting flow passage 5 upstream of the solenoid valve 1 acts to push the spool valve 7 upward in FIG. 2 and that of the solenoid side end of the spool valve 7 on which this pressure acts to push the spool valve 7 downward in FIG. 2 are set to be equal. Further, the pressure receiving area for receiving the pressure in the upstream side of the damping force adjusting flow passage 5 to push the spool valve 7 upward in FIG. 2 and that for receiving the pressure in the upstream side of the damping force adjusting flow passage 5 to push the spool valve 7 downward in FIG. 2 may not necessarily be the opposite end surfaces of the spool valve 7. That is, an area for receiving the pressure in the damping force adjusting flow passage 5 to press the spool valve 7 downward in FIG. 2 and an area for receiving the pressure in the damping force adjusting flow passage 5 to press the spool valve 7 upward in FIG. 2 only have to be equal. For example, a step portion may be provided at an intermediate position of the spool valve 7 and the pressure in the upstream side of the damping force adjusting flow passage 5 may be caused to act on the upper and lower surfaces of the step portion.

Next, the operation of the solenoid valve 1 is described. During an extension period of the damper D during which the piston 3 moves upward in FIG. 1 relative to the cylinder 2, resistance is given to the flow of the fluid moving from the extension side chamber R1 compressed by the piston 3 toward the compression side chamber R2 in the damping passage 13 while being given to the flow of the fluid from the extension side chamber R1 toward the reservoir R by the solenoid valve 1. That is, the damper D exerts an extension side damping force by the damping passage 13 and the solenoid valve 1 at the time of extension. The fluid is supplied from the reservoir R to the compression side chamber R2, which enlarges at the time of extension, via the suction passage 16 provided in the bottom member 14, and a volume change in the cylinder 2 caused by the exit of the piston rod 4 from the cylinder 2 is compensated for when the damper D extends.

On the contrary, during a contraction period of the damper D during which the piston 3 moves downward in FIG. 1 relative to the cylinder 2, resistance is given to the flow of the fluid moving from the compression side chamber R2 compressed by the piston 3 toward the extension side chamber R1 in the damping passage 13. Further, since a volume change in the cylinder 2 is compensated for by discharging the fluid corresponding to a reduction in the volume in the cylinder 2 caused by the entrance of the piston rod 4 into the cylinder 2 to the reservoir R via the compression side damping passage 15 of the bottom member 14, resistance is also given to the flow of the fluid also in this compression side damping passage 15. Thus, the damper D exerts a compression side damping force in the damping passage 13 and the compression side damping passage 15 and no fluid flows in the damping force adjusting flow passage 5. Therefore, the solenoid valve 1 is not involved in the generation of a compression side damping force.

That is, an extension side damping force when the damper D extends can be adjusted by driving the spool valve 7 in the solenoid valve 1 to make the flow path area of the damping force adjusting flow passage 5 variable.

Since the upper arrangement passage U arranged at least higher than the upper end of the spool housing portion S is provided in the downstream side of the damping force adjusting flow passage 5, the fluid level is higher than the spool housing portion S and the interior of the spool housing portion S is constantly filled with the fluid.

Further, the pressure in the upstream side of the damping force adjusting flow passage 5 is allowed to act on the pressure receiving surfaces on the opposite axial sides of the spool valve and the pressure receiving areas are equal.

Thus, the gas does not enter the spool housing portion S from the reservoir R to form a gas chamber above the spool housing portion S, and a thrust force for pushing the spool valve 7 downward does not become smaller than a thrust force for pushing the spool valve 7 upward due to the pressure in the upstream side of the damping force adjusting flow passage 5.

As a result, the thrust force for pushing the spool valve 7 upward and that for pushing the spool valve 7 downward using the pressure in the upstream side of the damping force adjusting flow passage 5 become equal. Thus, the pressure in the upstream side of the damping force adjusting flow passage 5 does not move the spool valve 7 in the axial direction at all and an adjustment of the flow passage area by the solenoid 8 is not affected even if the passing fluid produces a high pressure. Therefore, the flow passage area can be changed by driving the spool valve 7 by the solenoid 8 if necessary in adjusting the damping force.

Since the adjustment of the flow passage area by the solenoid 8 of the damping force adjusting flow passage 5 is not affected even if the passing fluid produces a high pressure in the front fork F of this embodiment, the thrust force of the solenoid 8 needs not be increased to overcome the pressure in the damping force adjusting flow passage 5 and the damping force can be adjusted by driving the spool valve 7 by the small-size solenoid 8.

Further, since the spool valve 7 is not moved by the pressure in the damping force adjusting flow passage 5, the damping force generated by the front fork F does not vary due to the pressure in the damping force adjusting flow passage 5 and a sufficient anti-vibration effect can be obtained.

Further, since the spool valve 7 can be driven without enlarging the solenoid 8, mountability into the saddle-ridden vehicle is not impaired and impairment of economic efficiency due to high cost is prevented.

By the above, this front fork F can utilize the low-cost and small-size solenoid 8 without sacrificing mountability, drastically improve damping force adjustment responsiveness thereof, and enable the damping force adjustment to be performed through an active control such as a sky-hook control.

Further, by providing the passage forming member 20, the downstream passage that is the downstream side of the damping force adjusting flow passage 5 can be easily formed and the upper arrangement passage U can be easily provided. Since the upper arrangement passage U only has to arrange a part of the downstream side of the damping force adjusting flow passage 5 at least higher than the upper end of the spool housing portion S, the downstream side of the damping force adjusting flow passage 5 may be formed without using the passage forming member 20. For example, the opening end of the port 6b that is open on the outer periphery of the housing 6 may be arranged higher than the upper end of the spool housing portion S.

Further, this front fork F includes the movable sleeve 9 inserted between the spool valve 7 and the housing 6 slidably in the axial direction and a pair of sleeve springs 25, 26 for sandwiching and elastically supporting the opposite axial ends of the movable sleeve 9. Since the mass Mb of the spool valve 7, the spring constant Kb of the spool spring 35, the mass Ms of the movable sleeve 9 and the combined spring constant Ks of the sleeve springs 25, 26 are set to satisfy the relationship of Mb/Kb=Ms/Ks, the spool valve 7 and the movable sleeve 9 do not relatively move in the axial direction and the relative positions thereof do not change even if a large acceleration acts on the front fork F in the axial direction of the spool valve 7 from the outside. This can prevent the damping force generated by the front fork F from deviating from an aimed damping force and changing in a vibrating manner, and a stable damping force can be exerted.

Although the spool valve 7 is biased by the single spool spring 35 in this embodiment, the spool valve 7 may be elastically supported at the opposite axial ends by a pair of springs similarly to the movable sleeve 9. In this case, the spring constant of the spool spring may be set to satisfy the above relationship as a combined spring constant of the two springs.

Since the front fork F of this embodiment can suppress a variation in the flow passage area in response to an external vibration input, it is suitable for a saddle-ridden vehicle used in such an environment that vibration is continually input and can exert a stable and aimed damping force also during the travel on a rough road on which a large vertical acceleration acts.

If it is not necessary to give consideration to external vibration, the movable sleeve 9 may be omitted and the flow passage area of the damping force adjusting flow passage 5 may be adjusted by directly bringing the outer periphery of the spool valve 7 into sliding contact with the hollow portion 6a of the housing 6 and causing the port 6b to face the spool port 21b to form a throttle.

Further, since the spool valve 7 is composed of the magnetic member 22 that functions as the movable iron core and the spool valve main body 21 that has a smaller specific weight than the magnetic member 22 in this embodiment, the weight of the entire spool valve 7 that is the movable part in the solenoid valve 1 can be reduced as compared with the case where the entire spool valve 7 is made of the magnetic material. By this, an inertial force acting on the spool valve 7 due to a large acceleration in an extension/contraction direction, which is the vertical direction, input to the damper D during the travel of the vehicle can be made minimal and the vibration of the spool valve 7 can be made minimal. Thus, the damping force generated by the solenoid valve 1 can be further prevented from deviating from an aimed damping force and changing in a vibrating manner, and a more stable damping force can be exerted. It should be noted that if it is not necessary to give consideration to make the vibration of the spool valve 7 minimal, the spool valve 7 may be made only of the magnetic material without forming the spool valve 7 of two members, i.e. with the spool valve main body 21 and the magnetic member 22.

Further, since the spool valve 7 is composed of the movable iron core, the spool valve 7 can be driven without via a separate long movable iron core or the like by arranging the solenoid 8 and the spool valve 7 very close to each other and damping force controllability is improved. Furthermore, since the weight of the movable part such as the spool valve 7 can be reduced, the damping force changing due to a vibration acceleration input to the damper D can be prevented, and a damping force can be stably generated and adjusted.

Further, the solenoid 8 includes the case 30 with the inner tube 30a that enables the insertion of the spool valve 7, the outer tube 30b that is arranged on the outer peripheral side of the inner tube 30a and the annular bottom portion 30c that connects the inner tube 30a and the outer tube 30b, the coil 31a housed in the case 30, and the base 33 that faces the inner tube 30a of the case 30 via the annular gap, is inserted into the inner peripheral side of the coil 31a and attracts the spool valve 7 through the energization of the coil 31a. The magnetic member 22 includes the base portion 22a that faces at least the inner tube 30a of the case 30 in the radial direction in a state attracted to the base 33 and the tubular socket 22b that extends from the base portion 22a toward the spool valve main body 21, faces the inner tube 30a of the case 30 in the radial direction and fits the outer periphery of the other end of the spool valve main body 21 to the fitting portion 21c formed to have a small diameter. Since the thickness of the base portion 22a constantly facing the inner tube 30a of the case 30 can be secured in this way, there is no likelihood that the cross-sectional area of the magnetic path becomes excessively small and magnetic flux density is saturated to reduce an attraction force, the vibration of the spool valve 7 can be more suppressed, and a damping force can be even more stably exerted.

Further, since the gas does not enter the spool housing portion S from the reservoir R to form the gas chamber above the spool housing portion S, the solenoid valve 1 can be consolidated above the body side tube 10 and the solenoid 8 is easily energized. Furthermore, since the solenoid valve 1 is connected to the body side of the saddle-ridden vehicle that is made vibration-proof by the damper D, the vibration of the spool valve 7 can be suppressed during the travel of the vehicle and a damping force variation caused by this vibration can be suppressed.

Further, since the piston rod 4 includes the hole 4b that forms a part of the damping force adjusting flow passage 5 along the axial direction and the piston rod 4 and the housing 6 connected to the leading end of the piston rod 4 are so connected that the hollow portion 6a and the hole 4b are coaxial and in series, a driving direction of the spool valve 7 coincides with the axial direction of the piston rod 4 and the solenoid 8 that drives the spool valve 7 does not laterally project out. By this, the damper D can be made slim as compared with the case where the driving direction of the spool valve 7 intersects with the axis line of the piston rod 4. Further, it is also possible to make the driving direction of the spool valve 7 different from the extension/contraction direction of the damper D, i.e. not coincide with the axis line of the piston rod 4. In this case, the vibration of the vehicle vibrating the spool valve 7 in the driving direction can be prevented since the vibration direction of the vehicle and the driving direction of the spool valve 7 do not coincide.

It should be noted that even if the shape and structure of the spool valve 7 differ from those described above, similar effects can be obtained if the mass Mb of the spool valve 7, the spring constant Kb of the spool spring 35, the mass Ms of the movable sleeve 9 and the combined spring constant Ks of the sleeve springs 25, 26 are set to satisfy the relationship of Mb/Kb=Ms/Ks.

Further, the housing 6 includes the housing portion 6c that is continuous with the hollow portion 6a and houses the solenoid 8, and the housing portion 6c is formed to face outward in FIG. 2 and fixed to the opening end of the body side tube 10. The adjuster 34 for adjusting the initial load of the spool spring 35 of the solenoid 8 is provided to face the outside of the damper D though the opening end of the body side tube 10. Since this enables the adjuster 34 to be operated from the outside, the initial load is easily adjusted. It should be noted that a uniform damping force adjustment free of a variation from product to product can be made by adjusting this initial load such as when the spring constant of the spool spring 35 varies. The damping force adjustment of the damper D may be made uniform by correcting the amount of a current applied to the solenoid 8.

It should be noted that since the damping force adjusting flow passage 5 allows communication between the extension side chamber R1 and the reservoir R and permits the passage of the fluid only when the damper D extends and the solenoid valve 1 functions as a damping force generating element for generating an extension side damping force of the damper D, the extension side damping force of the damper D can be adjusted. However, the damping force adjusting flow passage 5 may be set to allow communication between the compression side chamber R2 and the reservoir R and permit the passage of the fluid only when the damper D contracts, and a compression side damping force of the damper D may be adjusted by the solenoid valve 1. That is, if the compression side chamber R2, instead of the extension side chamber R1, is allowed to communicate with the hole 4b through the communication passage 4d provided in the piston connecting portion 4c, the solenoid valve 1 can adjust the compression side damping force. By this, the damping force adjusting flow passage 5 can be set to permit the passage of the fluid only when the damper D contracts.

Although the flow path area is set to decrease when the spool valve 7 retreats, the flow path area may be set to be minimized when the spool valve 7 is at the lowest position and to increase as the spool valve 7 retreats.

Further, the housing 6 may be united with the piston rod 4 to form one component or the housing 6 may be composed of a plurality of components.

Furthermore, although the connector 31d for energizing the coil 31a is united with the mold coil 31 in this embodiment, the connector 31d may be separated from the mold coil 31 and the coil 31a and the power supply terminal 31c may be connected by a cord. Further, the connector and the power supply terminal may be omitted and the coil 31a may be connected to the external power supply only via a cord.

The embodiments of the present invention described above are merely illustration of some application examples of the present invention and not of the nature to limit the technical scope of the present invention to the specific constructions of the above embodiments.

The present application claims a priority based on Japanese Patent Application No. 2011-079341 filed with the Japan Patent Office on Mar. 31, 2011, all the contents of which are hereby incorporated by reference.

The invention claimed is:

1. A front fork, comprising:
   a body side tube which is connected to a body of a saddle-ridden vehicle;
   an axle side tube which is connected to an axle of the saddle-ridden vehicle and is slidably fitted to the body side tube to form a space inside together with the body side tube;
   a damper which includes an extension side chamber compressed at the time of extension and a compression side chamber compressed at the time of contraction inside, is interposed between the body side tube and the axle side tube and is housed in the space;
   a reservoir which is provided inside the space and outside the damper;
   a damping force adjusting flow passage which allows communication between the compression side chamber or the extension side chamber as an upstream side and the reservoir as a downstream side; and a solenoid valve which includes a spool housing portion provided at an intermediate position of the damping force adjusting flow passage, a spool valve inserted into the spool housing portion movably in an axial direction and a solenoid driving the spool valve in the axial direction, and is configured to adjust a flow passage area of the damping force adjusting flow passage;

wherein:

pressure receiving areas on opposite axial sides of the spool valve on which a pressure in an upstream side of the damping force adjusting flow passage acts are made equal; and an upper arrangement passage which is arranged at least higher than an upper end of the spool housing portion is provided in a downstream side of the damping force adjusting flow passage.

2. The front fork according to claim 1, wherein:

the solenoid valve includes a housing with a hollow portion which forms a part of the damping force adjusting flow passage and a port which is open to the outside, communicates with the hollow portion and forms a part of a side of the damping force adjusting flow passage downstream of the hollow portion;

the spool valve includes a pressure introducing hole which is open on one axial end side for receiving a pressure in the upstream side of the damping force adjusting flow passage and communicates with the other axial end side and a spool port which is open on the outer periphery and communicates with the pressure introducing hole;

a passage forming member is provided which is mounted on the outer periphery of the housing and forms an annular clearance, which forms a part of the downstream side of the damping force adjusting flow passage for allowing the port to communicate with the reservoir, between the housing and the passage forming member; and a final end of the annular clearance serves as the upper arrangement passage.

3. The front fork according to claim 2, wherein:

the solenoid valve includes a spool spring for biasing the spool valve against an attraction force of the solenoid, a movable sleeve inserted between the spool valve and the housing slidably in the axial direction, and a pair of sleeve springs for sandwiching and elastically supporting opposite axial ends of the movable sleeve; and a mass Mb of the spool valve, a spring constant Kb of the spool spring, a mass Ms of the movable sleeve and a combined spring constant Ks of the sleeve springs are set to satisfy a relationship of $Mb/Kb=Ms/Ks$.

4. The front fork according to claim 3, wherein:

the spool valve includes a spool valve main body slidably inserted into the movable sleeve and a magnetic member united with a solenoid side end of the spool valve main body and configured to function as a movable iron core of the solenoid; and a specific weight of the spool valve main body is smaller than that of the magnetic member.

5. The front fork according to claim 3, wherein:

a sleeve side angular groove communicating with a sleeve port is provided along a circumferential direction on the outer periphery of the movable sleeve and constantly faces the port of the housing.

6. The front fork according to claim 2, wherein:

the damper includes a cylinder, a piston slidably inserted into the cylinder to partition the interior of the cylinder into the extension side chamber and the compression side chamber, and a piston rod inserted into the cylinder and connected to the piston; and the housing is connected to the upper end of the piston rod and the piston rod is connected to the body side tube.

* * * * *